Figure 1:
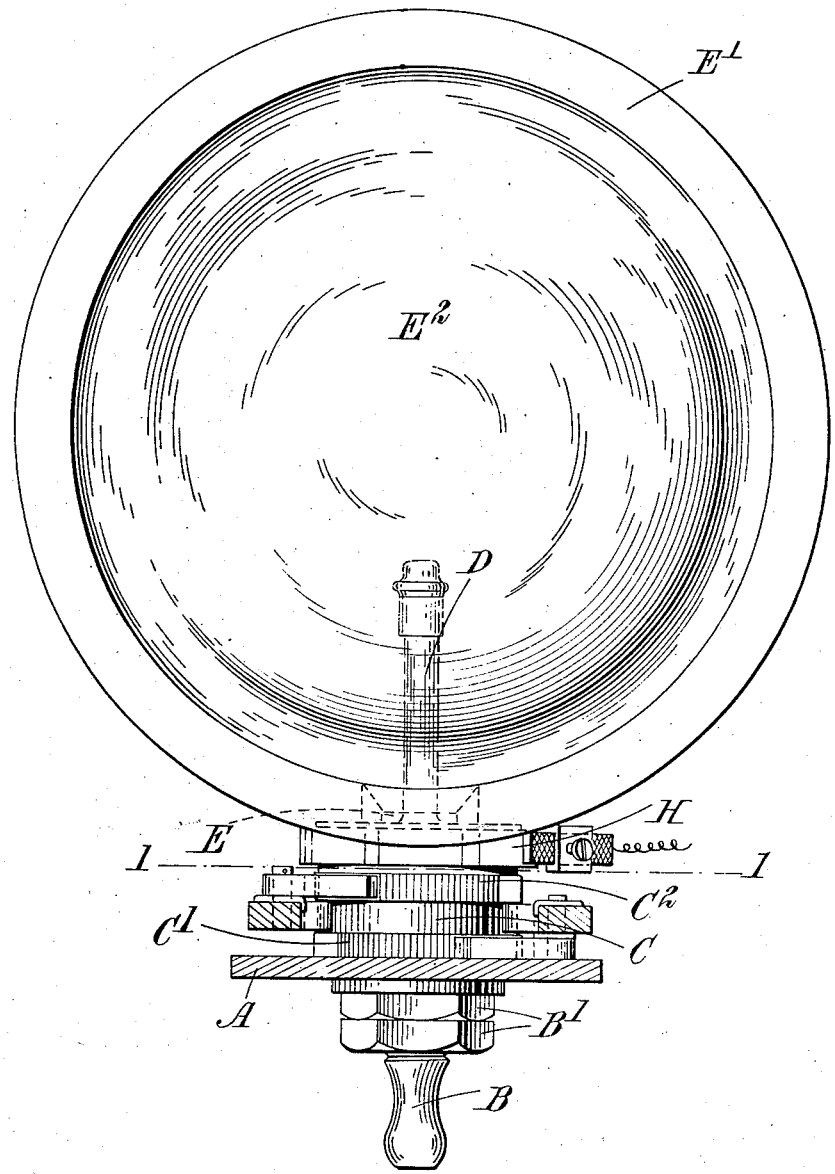

A. E. MacDONALD.
VEHICLE LAMP.
APPLICATION FILED MAR. 16, 1912.

1,083,112.

Patented Dec. 30, 1913.
4 SHEETS—SHEET 1.

Witnesses

Inventor
A. E. MacDonald

A. E. MacDONALD.
VEHICLE LAMP.
APPLICATION FILED MAR. 16, 1912.
1,083,112.
Patented Dec. 30, 1913.
4 SHEETS—SHEET 2.
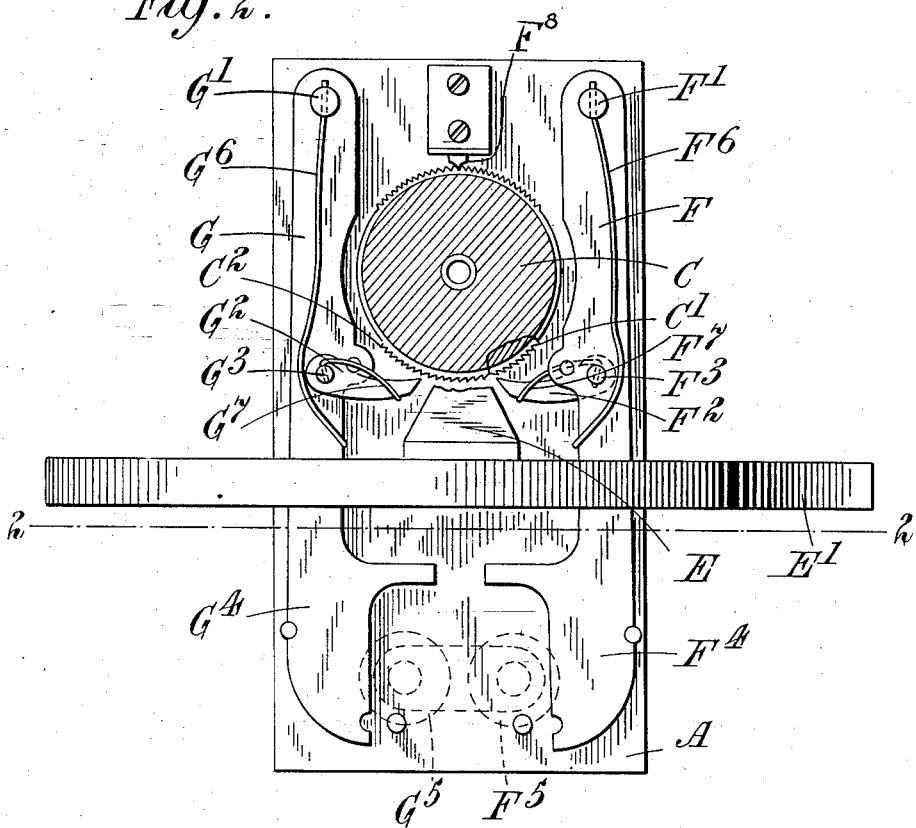

A. E. MacDONALD.
VEHICLE LAMP.
APPLICATION FILED MAR. 16, 1912.
1,083,112.  Patented Dec. 30, 1913.
4 SHEETS—SHEET 3.
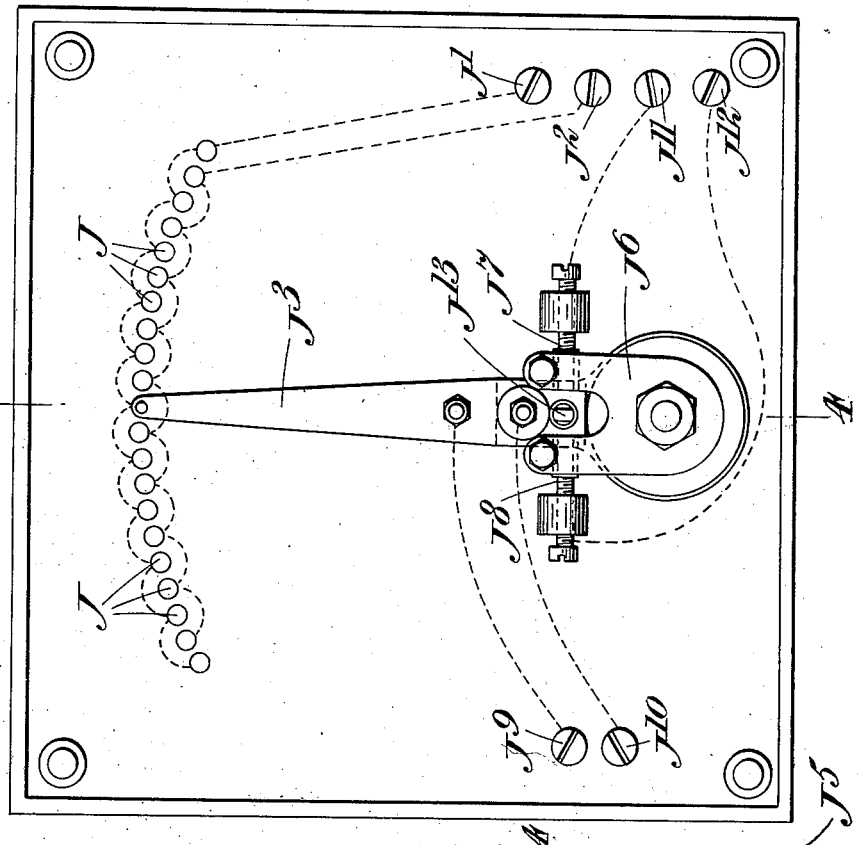
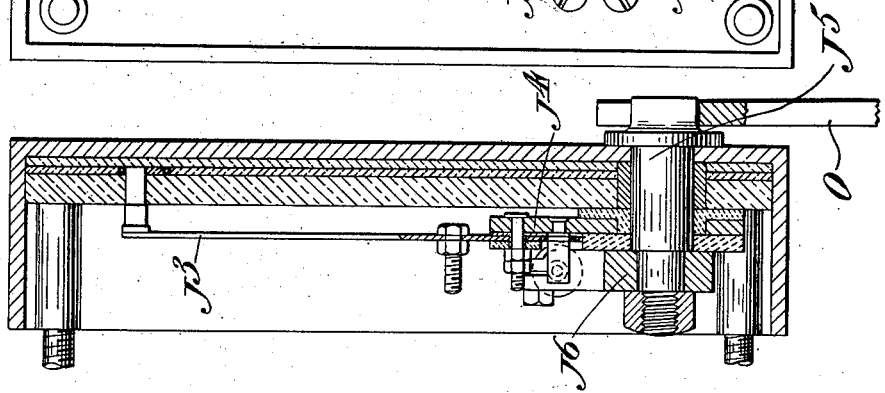

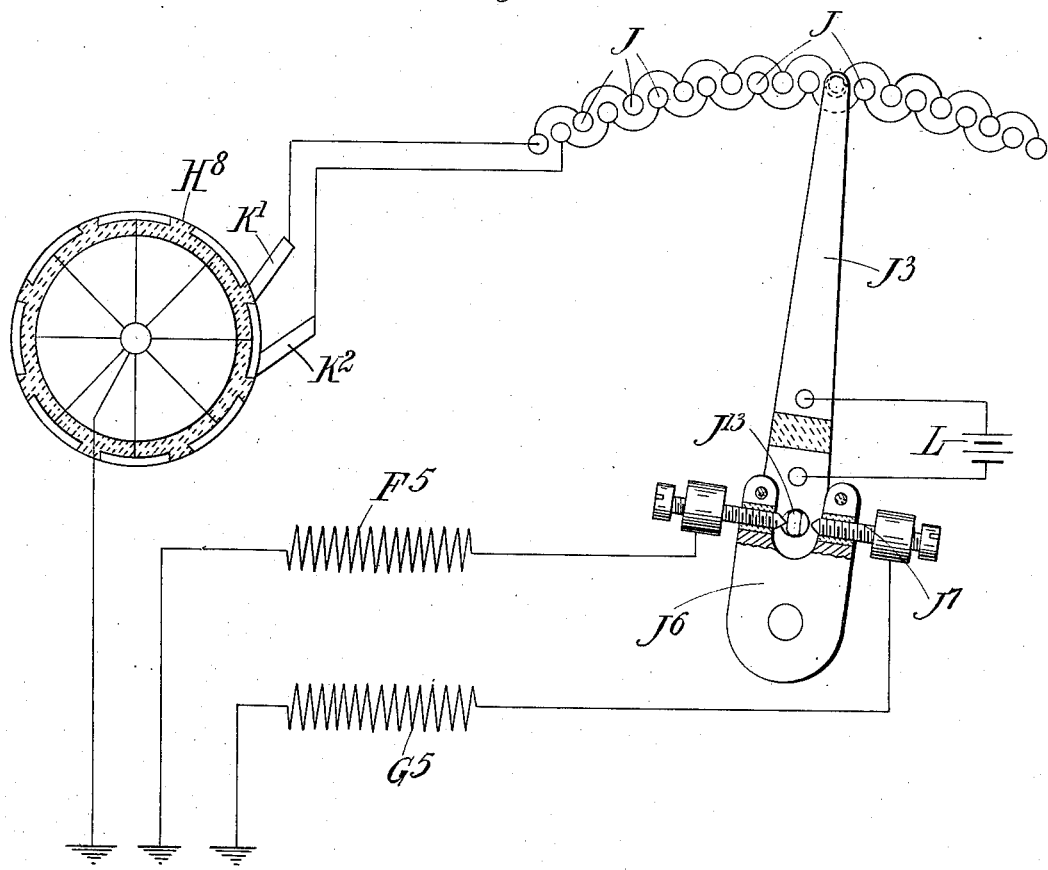

UNITED STATES PATENT OFFICE.

ARTHUR ERNEST MacDONALD, OF LONDON, ENGLAND.

VEHICLE-LAMP.

1,083,112.  Specification of Letters Patent.  Patented Dec. 30, 1913.

Application filed March 16, 1912. Serial No. 684,168.

*To all whom it may concern:*

Be it known that I, ARTHUR ERNEST MAC-DONALD, a subject of the King of England, residing at London, England, have invented certain new and useful Improvements in Vehicle-Lamps, of which the following is a specification.

This invention relates to improvements in lamps and has particular reference to lamps employed as headlights for vehicles.

The term vehicle is employed to include wheeled vehicles and also boats and in the particular description which follows hereinafter the reference to motor vehicles is to be understood to cover boats and other vehicles employed for transit.

Hitherto, in motor vehicles it has been suggested to provide operative connections between the steering gear and the lamp-casing so that the lamp as a whole has been moved about a vertical axis to alter the direction of the issuing beam automatically with a movement of the steering gear. According to this invention, however, in a vehicle lamp there are provided operative connections between either the source of light or the reflector or both and the steering mechanism of the vehicle so that one or both of them is or are automatically moved by any suitable operating means in relation to the lamp-casing when the steering is changed with or without other operative connections manually controlled to enable the driver to supplement the automatic action by a manual control.

In a preferred construction the reflector and the source of light are so mounted relatively to one another that the direction of the issuing beam of light is altered in a horizontal plane.

Other features of the invention will be more clearly understood with reference to the accompanying drawings, in which—

Figure 1 shows an elevation, having parts in section, of a reflector, a source of light and operating gear for the former; Fig. 2 is a plan, partly in section of Fig. 1; Fig. 3 is a plan of a special form of switch employed; Fig. 4 is a section on the line 4—4 of Fig. 3, and Fig. 5 is a diagram of electrical connections employed.

Like letters indicate like parts throughout the drawings.

In the base A inside the casing of the lamp which is not shown in the drawings, is screwed a gas-connection B secured therein by a nut and lock nuts as at $B^1$. Mounted on a projection of the gas-connection is a drum C carrying ratchets $C^1$ and $C^2$ having teeth cut in reverse directions, as shown in Fig. 2. The drum C has a hole through it and in the hole is a burner D which is thereby arranged above the gas-inlet B in a gas-tight manner and which preferably moves with any movement of the drum C. Carried on an arm E supported by and moved with the drum C is a ring $E^1$, in which is secured a reflector $E^2$. As more clearly shown in Fig. 2, there is pivoted on one side of the drum at $F^1$ a lever F supporting a pawl $F^2$ pivoted at $F^3$, the end of which engages with the ratchet $C^1$. The lever F extends to the other end of the base A and forms an iron armature $F^4$ which is operated upon by an electromagnet $F^5$ whose function will be hereinafter more fully described. The lever F is normally held away from the magnet $F^5$ by means of a spring $F^6$ and the pawl $F^2$ is normally held by a spring $F^7$ in position for engaging the ratchet $C^2$ upon swing of said lever F; a spring stop $F^8$ engaging the ratchet $C^1$ for yieldingly locking the drum C against rotation. In a similar manner on the other side of the drum C there is a lever G pivoted at $G^1$ supporting a pawl $G^2$ pivoted at $G^3$ and having an enlarged portion $G^4$ forming an armature for the electromagnet $G^5$ while springs $G^6$ and $G^7$ are provided to control the lever G and the pawl $G^2$ respectively.

Carried by the drum C is a contact drum H which will rotate with it or may be geared to it to rotate with it but at a greater speed or less as required. The contact drum H may, however, be mounted separately from the drum C and may carry ratchet wheels to be engaged and moved by pawls on the levers F and G in a similar manner to the drum C.

A controlling switch, shown in Figs. 3 and 4 and digrammatically in Fig. 5, is moved by an operative connection from the steering gear or from some part of the vehicle which is affected by a change in direction of the latter. It consists of a number of contacts J wherein alternate contacts are connected to one another and are connected to terminals $J^1$ $J^2$. The contact arm engaging these contacts consists of a metallic portion $J^3$ connected to an arm $J^4$ but insulated therefrom, the latter being moved by the pin $J^5$ but itself being insulated from the pin. The pin $J^5$ is operated upon by the steering gear or other part of the vehicle referred to above. A lever is shown diagrammatically at O in connection with the pin $J^5$; said lever O being operatively connected with a portion of the steering gear and of any convenient design preferred by the user. The particular shape or construction of these connections in themselves, however, are not part of the present invention. Secured to the pin $J^5$ is a bifurcated member $J^6$ carrying contact screws $J^7$ and $J^8$ which are insulated from the member $J^6$. Electrical connections are made between a terminal screw on the arm $J^3$ and a terminal $J^9$ on one side of the switch box, shown in dotted lines, and a further connection is made between another terminal $J^{10}$ at the side of the box and a terminal screw on the arm $J^4$, which is also indicated in dotted lines. Electrical connections are made between the contact screws $J^7$ and $J^8$ and the terminals $J^{11}$ and $J^{12}$ respectively, as shown. A battery or other convenient source of electric current is connected through a switch across the terminals $J^9$ and $J^{10}$; connections from the terminals $J^1$ and $J^2$ are made to brushes contacting with the drum H previously referred to and connections are made between the terminals $J^{11}$ and $J^{12}$ and the electro-magnet coils $F^5$ and $G^5$ respectively, the other ends of the magnet windings being earthed. The contacts on the contact drum H are also earthed.

Referring to Fig. 5, which indicates a diagram of connections employed, it will be seen that the contact drum H has been shown as having only eight contacts on it, for the sake of clearness, but if it is to be carried by the drum C it should have as many contacts as there are contact points J while if it is to be geared to the drum C, the number will be in proportion to the ratio of the gearing. Brushes $K^1$ $K^2$ in connection with the contacts J are so spaced relatively to the contacts that when one is engaged by a contact, the other is between it and the next contact while with one movement of the drum due to the movement of the switch, which will be hereinafter explained, a contact behind the brush between the two contacts shall move forward to make contact with that brush while the brush which was previously in contact shall be between two other contacts.

Assuming the vehicle has been running steadily, the conditions of electric circuit shall be as shown in Fig. 5 and assuming the car is to be turned to the left, the first movement will be that the member $J^6$ is moved by the pin $J^5$ until the contact screw $J^7$ engages with a metallic projection $J^{13}$ extending from the arm $J^4$. Following upon this the switch arm will be moved until it is brought into a contact J which is connected to the brush $K^2$ and current will then flow as follows:—from the battery L current will flow through the projection $J^{13}$ to the contact screw $J^7$ and through its connection to the electro-magnet coil $G^5$. From the coil $G^5$ it flows through its earthed connection to the contacts on the drum $H^8$ through the brush $K^2$ and back through the contact J and the switch arm $J^3$ to the battery. This causes the electro-magnet $G^5$ to be energized and the armature $G^4$ will be drawn to it. In so doing the pawl $G^2$ engaging the ratchet $C^2$ turns the drum C. Movement of the drum C disengages the contact from the brush $K^2$ but brings the next contact to engage with the brush $K^1$ and it will be readily seen that it leaves the next stop on either side of the switch arm $J^3$ in a condition for completing an electric circuit through one or other of the magnet windings $F^5$ or $G^5$.

What I claim as my invention and desire to secure by Letters Patent is:—

1. In a head light, the combination of movable means for shifting the direction of the light rays, operating mechanism for said movable means normally maintained out of engagement with the latter, means for locking said movable means in position during the disengagement of said operating mechanism therewith, and means for shifting said operating mechanism into actuating engagement with said movable means.

2. In a head light, the combination of movable means for shifting the direction of the light rays, operating mechanism therefor including an electro-magnet, means for normally maintaining said operating mechanism out of engagement with said movable means, and means including a shiftable device for successively energizing and deënergizing said electro-magnet during continued movement of said shiftable device.

3. In a head light, the combination of movable means for shifting the direction of the light rays, operating mechanism therefor including an electro-magnet, means for normally maintaining said operating mechanism out of engagement with said movable means, a normally open electric circuit connected to the winding of said electro-magnet, and a shiftable device for successively closing and opening said circuit during continued movement of said device.

4. In a head light, the combination of pivoted means for shifting the direction of the light rays, independent mechanisms for swinging said pivoted means in opposite directions, independent actuating means for each of said mechanisms, and means for operatively connecting said actuating means to a common source of energy.

5. In a vehicle head lamp, the combination of movable means for shifting the direction of the light rays, operating means for said movable means normally maintained out of engagement with the latter, and connections between the vehicle steering mechanism and said operating means for shifting the latter into operative engagement with said movable means.

In testimony whereof I have signed my name to this specification in the presence of two subscribing witnesses.

ARTHUR ERNEST MacDONALD.

Witnesses:
CHARLES FRENCH,
ARTHUR DOWNS PIATT.